United States Patent Office 3,524,797
Patented Aug. 18, 1970

3,524,797
LYSINE PRODUCTION
H. Boyd Woodruff, Plainfield, and Marion Jackson, Cranford, N.J., assignors to Merck & Co., Inc., Rahway, N.J., a corporation of New Jersey
No Drawing. Filed Aug. 8, 1967, Ser. No. 659,036
Int. Cl. C12d 13/06
U.S. Cl. 195—29                    3 Claims

ABSTRACT OF THE DISCLOSURE

The processing of producing lysine by cultivating a lysine producing mutant microorganism which possesses a double amino acid deficiency, one of which is homoserine.

---

This application is concerned with an improved method for the preparation of lysine. The application is further concerned with preventing the reversion of mutant lysine producing organisms to a non-mutant state. More particularly, it is concerned with the improved production of lysine in a substantial amount by the cultivation of a double mutant of Micrococcus glutamicus.

The species known commonly as Micrococcus glutamicus is a species which has been various defined by other names by leading taxonomists. The classification of Micrococcus glutamicus is dependent upon the conditions under which the culture is grown, the criteria considered dominant in establishing the genus, and the classification scheme accepted by the taxonomist. It should be noted that other investigators may classify the same microorganism as Micrococcus, Brevibacterium, Corynebacterium, Bacterium, Microbacterium or Arthrobacter. For the purposes of the present invention, all of the selected microorganisms will be referred to as Micrococcus glutamicus, recognizing that the classification of these microorganisms varies somewhat in accordance with the classification method employed by the taxonomist.

Lysine is a well-known, essential amino acid which is indispensible for human and animal nutrition. The amino acid may be prepared by a number of methods described in the literature; for example, by fermentation methods as described in U.S. Pats. 2,771,396 and 2,841,532. In the former case, the process requires inoculation with two separate microorganisms for the preparation of the amino acid. In the latter case, two distinct steps are required for the successful production of lysine. In addition, lysine has been directly produced in a fermentation medium by the culturing of nutritionally deficient mutants of Micrococcus glutamicus, such as M. glutamicus ATCC 13286 or M. glutamicus ATCC 13287, as reported in U.S. Pat. 2,979,439. These lysine producing organisms, hereinafter referred to as the "parent" culture, require homoserine for their growth. However, the lysine production culture has been found to revert from the homoserine requirement at various rates depending on media and other fermentation conditions. The tendency of the culture to change from a homoserine-dependent culture to homoserine independence adversely affects the production of lysine. For example, the homoserine-dependent lysine-producing culture will convert sugar to lysine at a rate of 30% during the first 24 hours of fermentation. However, this same culture becomes unstable and after 96 hours reverts to a low lysine producing culture which is homoserine-independent converting sugar to lysine at a much reduced rate. Because of the constant increase in proportion of revertants with time, the revertants eventually take over the fermentation and lysine production virtually ceases. Thus, the lysine-producing culture disclosed in U.S. Pat. 2,979,439 obviously has serious drawbacks as far as its performance in continuous factory fermentors. The presence of the reverted cultures is detrimental to the lysine production process. Various methods have been tried to control the reversion with little success, including pretesting lots of crude medium ingredients to select those which promoted the smallest degree of culture reversion and the substitution of the more expensive ingredient glucose for molasses, as the latter tends to enhance reversion.

It has now been found that the fermentation performance of the parent lysine producing mutant, Micrococcus glutamicus, may be stabilized by the use of mutant cultures of the parent microorganisms having a double amino acid deficiency, one of which is homoserine. For example, double auxotrophs which require in addition to homoserine, at least one of threonine, isoleucine or methionine for growth, have been found to be highly stabilized cultures regarding their tendency to revert to homoserine independence. Moreover, by employing the newly discovered double auxotrophs of Micrococcus glutamicus, it is possible not only to prevent reversion of the cultures to a non-mutant state, but many of the microorganisms bearing a double mutation in the homoserine pathway produce lysine in higher yields and at a greater economy than heretofore possible. A living culture of a representative sampling of these double auxotrophic organisms have been deposited in the United States Department of Agriculture's Northern Utilization Research and Development Division, Peoria, Illinois, where they have been assigned the following NRRL numbers: B–3331; B–3332; B–3333; B–3334; B–3335; B–3337; B–3338; B–3339 and B–3340.

The theoretical explanation as to why the nutritionally deficient double auxotrophs of the invention are superior cultures for the production of lysine lies in the discovery that a culture with a double mutational block in the biochemical pathways which are undesirable and inhibitory for lysine production, namely;

1) homoserine → threonine → isoleucine

2) 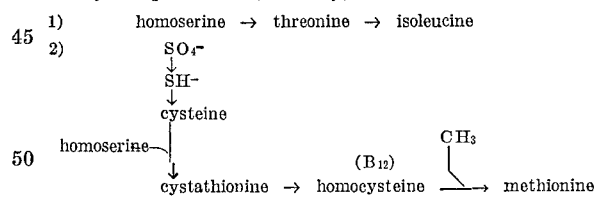

is a highly stabilized culture insofar as reversion to homoserine independence is concerned.

The method of acquiring the nutritionally deficient mutants which are homoserine-threonine, homoserine-isoleucine or homoserine-methionine dependent has been well established and one skilled in the art may readily obtain the required mutual from a given parent by applying conventional mutation techniques. The double auxotrophs of Micrococcus glutamicus can be prepared by the mutation of a homoserine-dependent culture of Micrococcus glutamicus employing either ultraviolet light, N-methyl, N-nitroso-N-nitroguanidine or N-amyl-[Bis(β-chloroethyl)]amine·HCl as the mutagenic agent, followed by selection of the double auxotroph. This procedure is well known to those skilled in the art and commonly employed in the development and isolation of bacterial mutants.

The present invention provides an economical and practical method of preparing lysine which is particularly amenable to large scale commercial production. Suitable media for growing these multiple auxotrophic strains to produce lysine contain (a) a carbon source, for example, one or a combination of two or more saccharides or other carbon sources; (b) a nitrogen source, for example, one or a combination of two or more nitrogen containing compounds; (c) a phosphorus source, for example, one or more phosphorus containing compounds; and suitable sources of (d) threonine, isoleucine and methionine, and (e) inorganic salts for promoting the culturing of said multiple auxotrophs whereby lysine is directly produced and accumulated intact in said media. Said culturing media for carrying out the fermentation with said multiple auxotrophs are preferably liquid aqueous media containing the aforesaid components therein, preferably as solutes. It is further noted that where homoserine-isoleucine dependent mutants are involved, it is desirable to include a source of leucine.

The carbon sources include various carbohydrates, such as glucose, fructose, mannose, sucrose, maltose, etc. The nitrogen sources include various inorganic ammonium compounds, such as the sulfates, chlorides, acetates, etc., of ammonium ($NH_4$) and various nitrogenous substances, such as enzymatic digest of casein, urea, etc. The phosphorus sources are preferably inorganic phosphates, such as $(NH_4)_2HPO_4$, $K_2HPO_4$, $KH_2PO_4$, $Na_2HPO_4$, $NaH_2PO_4$. The inorganic salts preferably include $MgSO_4$ and other inorganic salts which promote the growth of said multiple auxotrophs. Said media can also include other compounds, such as calcium carbonate for adjusting and/or controlling the pH of the medium.

The threonine, isoleucine and methionine are preferably used in the free base form, in the form of their acid salts or as hydrolysed protein. The quantity of each per liter of said aqueous culturing media is preferably in the range of about 100 mg. of methionine, 250 mg. of threonine and 250 mg. of isoleucine per liter. It should be noted that when homoserine-isoleucine double auxotrophs are involved, it is desirable to add leucine to the system, preferably in the range of 250 mg. per liter of culture media.

The culturing of these homoserine-threonine, homoserine-methionine and homoserine-isoleucine requiring auxotropic strains is conducted in said media under aerobic conditions. An aerated deep tank may be employed utilizing submerged fermentation techniques. Temperatures in the range of about 25–37° C. and pH conditions of about 6.0 to 8.0 are generally employed whereby lysine is produced and accumulated in appreciable amounts; that is, at least 20 grams/liter.

The lysine produced by the fermentation process may be isolated and recovered by conventional methods, such as ion exchange treatment, as described in U.S. Pats. 2,955,986 and 2,979,439. For example, the fermentation broth is adjusted to pH 2 with hydrochloric acid or sulfuric acid, filtered and the L-lysine absorbed by passing the filtrate through a strong cation exchange resin, such as the sulfonic acid resin, Amberlite, IR–120 (Rohm & Haas Co.) and eluted by dilute alkali such as ammonium hydroxide. The eluate after boiling to remove ammonia is then passed through a weak cation exchange resin such as the carboxylic acid resin, Amberlite IRC–50 (Rohm & Haas Co.) which absorbs L-lysine. L-lysine is eluted with dilute ammonium hydroxide and the eluate freed of ammonia. L-lysine is obtained as the hydrochloride by adjusting to pH 5.0 and concentrating.

The following is a specific method, given by way of illustration and not limitation, for producing homoserine-threonine and homoserine-methionine requiring double auxotrophs of the parental microorganism, *Micrococcus glutamicus*, the composition of the medium used being shown in the following table:

B–1 (MINIMAL)

| | Per liter |
|---|---|
| Sodium citrate·$2H_2O$ | g.. 5.0 |
| $K_2HPO_4$ | g.. 7.0 |
| $KH_2PO_4$ | g.. 3.0 |
| $(NH_4)_2SO_4$ | g.. 2.5 |
| $MgSO_4·7H_2O$ | g.. 0.1 |
| $MnSO_4·H_2O$ | mg.. 5 |
| NaCl | g.. 0.1 |
| $FeSO_4·7H_2O$ | mg.. 10 |
| Biotin | μg.. 15 |
| Thiamine | μg.. 50 |
| Adenine | mg.. 2 |
| Guanine | mg.. 2 |
| Uracil | mg.. 2 |
| Homoserine | g.. 1.0 |
| Agar | g.. 20.0 |
| Dextrose (sterilized separately) | g.. 10.0 |
| Distilled $H_2O$ | ml.. 1000 |
| pH (as is) | g.. 7.1–7.4 |

B–1(minimal) plus ⎡DL-methionine 50 μg./ml.⎤
⎣DL-threonine 100 μg./ml.⎦

DAVIS SALTS SOLUTION

| | |
|---|---|
| $K_2HPO_4$ | g.. 7.0 |
| $KH_2PO_4$ | g.. 3.0 |
| Sodium citrate·$2H_2O$ | g.. 0.5 |
| $MgSO_4·7H_2O$ | g.. 0.1 |
| $(NH_4)_2SO_4$ | 1.0 |
| Dist. $H_2O$ | ml.. 1000 |

PROCEDURE

The parent homoserine-dependent *Micrococcus glutamicus* organism was incubated at 28° C. for 1–2 days on a B–1 slant. These cells were then suspended in 15–25 ml. of Davis salts solution, shaken well to disperse and filtered through adsorbent cotton. The cell suspension was then subjected to a U.V. mutagen as follows:

The cells were stirred, using a magnetic stirrer, in a Petri plate at a distance of 12 inches from a bactericidal ultraviolet lamp for a period of time during which 1 ml. samples were removed at one-half minute intervals and diluted to 100 ml. in sterile Davis salts solution. These 100 ml. suspensions were then plated onto B–2 medium plates at 0.1 ml. per plate, and that treatment time giving a plate count of from 30 to 100 colonies per plate (ca. 99.99% kill) was used for further plating. These original plates were incubated for 3 days at 28° C. or until colonies of about 1/16 inch diameter were obtained. These were replicated onto B–2 and B–1 medium plates using sterilized velveteen over a wooden block. The replicated plates were incubated for 1 day at 28° C. and then read by superimposing the B–1 over the B–2 plate and noting any colonies appearing on the B–2 but not on the B–1 plate. Such colonies, from the original plate, were inoculated onto B–2 medium slants and, after 1–2 days incubation, were rechecked as to their specific requirement using plates containing the B–1 medium plus either methionine or threonine individually.

The desired auxotrophs may also be obtained by employing one or more chemical mutagenic agents, such as n-amyl-[Bis(β - chloroethyl]amine·HCl, N-methyl, N-nitroso-N′-nitroguanidine and ethylenimine. Mutants also result from exposure to ultraviolet light combined with ethyl sulfate.

For example, the chemical mutagenic agent, n-amyl-[Bis(β-chloroethyl]amine·HCl, was added to the cell suspension, containing 400 mg. of sodium bicarbonate, in 4 mg. amounts at 10 minute intervals and, at the end of each 10 minute treatment period, a 5 ml. sample was transferred to 100 ml. of the Davis salts solution also containing 0.12 g. sodium bicarbonate and 0.12 g. glycine. These cells were then plated and the colonies examined as previously stated. Nine stable auxotrophs which are homoserine-threonine or homoserine-methionine dependent were obtained in this manner. Homoserine-isoleucine requiring mutants are obtained in a similar manner involving well recognized techniques of mutation and selection.

It will be appreciated by one skilled in the art that the stable auxotrophs of the present invention may also be obtained by starting with mutants of the parent culture, said mutants being obtained by exposing the parent culture to mutation agents such as those indicated above.

REVERSION

Of the double auxotrophs that may be prepared according to the invention, Table I below reports the reversion frequency of ten double mutants which have been tested for reversion both to homoserine and to their second requirement through four generations of molasses production medium. This medium was dispensed into baffled, 250 ml. flasks at 40 ml. per flask and autoclaved 20 min. at 120° C. The first generation flasks were inoculated with 2 mm. loopful of cells from a second generation, M.Y.P.M., slant of the auxotrophs under test. The flasks were shaken on a 220 r.p.m. shaker, 2-inch throw, at 28° C. for 48 hours. One ml. of this broth was used to inoculate the second generation flasks which were, in turn, incubated for 48 hours. The third and fourth generations were completed using the same technique. The cells from each flask were diluted and plated onto: (1) the B-1 medium; (2) B-1 medium minus homoserine (designated A-9); (3) A-9 medium with the second, individual, requirement added; and (4) the B-1 medium with the second, individual, requirement added. Number 4 was used to determine the total cell count in the broth, number 3 determined the number of cells reverted from the homoserine requirement, number 1 determined the number of cells reverted from the second requirement, and number 2 determined the number reverted from both requirements.

M.Y.P.M. (COMPLEX)

Peptone—10.0 g./l.
Beef extract—5.0 g./l.
Yeast ext.—5.0 g./l.
NaCl—2.5 g./l.
Agar—25.0 g./l.
Dist. $H_2O$—1000 ml.
pH to 7.1 with NaOH

LYSINE PRODUCTION MEDIUM (MOLASSES)

Invert molasses 11% by wt.
Soybean hydrolysate 1.5% as Soybean meal
$(NH_4)_2SO_4$ 0.7%
Distilled $H_2O$ pH to 7.1 with NaOH urea 0.5% added post sterily 120°–1 min. $MgHPO_4$–1.45% heat dry in a 175° C. oven for 1 hr. and add post sterily (dry)

TABLE I.—ALL COUNTS PER ML. OF BROTH

A

| Culture requirement | Gen. | A9 | B-1 | A9+threonine | B-1+threonine |
| --- | --- | --- | --- | --- | --- |
| Control: Homoserine only | I | $2 \times 10^4$ | $1.2 \times 10^{10}$ | | |
| | II | $1 \times 10^5$ | $2 \times 10^{10}$ | | |
| | III | $1 \times 10^7$ | $2.3 \times 10^{10}$ | | |
| | IV | $2 \times 10^8$ | $2.2 \times 10^{10}$ | | |
| L-8 (NRRL B-3333): Homoserine+ threonine. | I | $0(<10)$ | $0(<10)$ | $1.5 \times 10^3$ | $1.1 \times 10^{10}$ |
| | II | $0(<10)$ | $0(<10)$ | $9 \times 10^2$ | $1.5 \times 10^{10}$ |
| | III | $0(<10)$ | $0(<10)$ | $2.6 \times 10^3$ | $1.7 \times 10^{10}$ |
| | IV | $0(<10)$ | $0(<10)$ | $1.25 \times 10^3$ | $1.5 \times 10^{10}$ |

| | | | | A9+methionine | B-1+methionine |
| --- | --- | --- | --- | --- | --- |
| L-5 (NRRL B-3331): Homoserine+ methionine or $B_{12}$. | I | $0(<10)$ | $1.2 \times 10^3$ | $1.1 \times 10^3$ | $1.1 \times 10^{10}$ |
| | II | $0(<10)$ | $2.5 \times 10^3$ | $2.5 \times 10^3$ | $2.2 \times 10^{10}$ |
| | III | $0(<10)$ | $4.5 \times 10^3$ | $5.3 \times 10^3$ | $1.4 \times 10^{10}$ |
| | IV | $0(<10)$ | $1 \times 10^4$ | $3 \times 10^4$ | $1.8 \times 10^{10}$ |
| L-12 (NRRL B-3332): Homoserine+ methionine. | I | $0(<10)$ | $2 \times 10^3$ | $2.6 \times 10^3$ | $1.1 \times 10^{10}$ |
| | II | $0(<10)$ | $2 \times 10^3$ | $1.5 \times 10^3$ | $1.5 \times 10^{10}$ |
| | III | $0(<10)$ | $4 \times 10^3$ | $0.88 \times 10^3$ | $1.4 \times 10^{10}$ |
| | IV | $0(<10)$ | $1 \times 10^4$ | $1.3 \times 10^3$ | $2.2 \times 10^{10}$ |

B

| Culture requirement | Gen. | A9 | | | |
| --- | --- | --- | --- | --- | --- |
| Control: Homoserine only | I | $1 \times 10^4$ | $2 \times 10^{10}$ | | |
| | II | $1.8 \times 10^5$ | $1.8 \times 10^{10}$ | | |
| | III | $1.2 \times 10^7$ | $7 \times 10^{10}$ | | |
| | IV | $2 \times 10^8$ | $3.8 \times 10^{10}$ | | |
| L-7 (NRRL B-3334): Homoserine+ methionine. | I | $0(<10)$ | $2 \times 10^3$ | | |
| | II | $0(<10)$ | $1.5 \times 10^3$ | | |
| | III | $0(<10)$ | $1.8 \times 10^3$ | $1.3 \times 10^3$ | $2.6 \times 10^{10}$ |
| | IV | $0(<10)$ | $2.9 \times 10^3$ | $4 \times 10^3$ | $2.0 \times 10^{10}$ |
| L-14 (NRRL B-3335): Homoserine+ methionine. | I | $0(<10)$ | $3 \times 10^2$ | | |
| | II | $0(<10)$ | $9 \times 10^2$ | | $1.3 \times 10^{10}$ |
| | III | $0(<10)$ | $1.3 \times 10^3$ | $8 \times 10^2$ | $2.0 \times 10^{10}$ |
| | IV | $0(<10)$ | $4 \times 10^3$ | $3 \times 10^3$ | $1.7 \times 10^{10}$ |

It is readily apparent that the proportion of the control culture which had reverted to homoserine dependence increased steadily throughout the four generations in both tests. These reverted cultures do not produce lysine and their presence is detrimental to the production process.

Auxotroph L-8, with its second block between homoserine and threonine, showed no reversion to the threonine requirement through the four generations and a constant proportion of about one in ten million showing the homoserine-less reversion.

Auxotroph L-12 gave small, fairly constant, reversion proportions individually to the methionine and homoserine requirement. None of the cells lost both requirements, therefore, L-12 is a stabilized culture. Results with the L-14 auxotroph are similar to those of L-12.

Cultures L-7 and L-14 also were stabilized cultures in the fact that no cells were observed which lost both the homoserine and the methionine requirement. All were superior to the parent since far fewer nonlysine producing homoserine revertants appearedd uring the course of four repeated transfers in production medium.

HOMOSERINE—ARGININE MUTANT

To demonstrate that a double mutant in pathways other than those described above is unsatisfactory, an arginine-homoserine double mutant (L-20) (NRRL B-3336) was prepared. Reversion of this culture at the homoserine locus was nearly as frequent as with the control and by the fourth generation cells which had reverted to both blocks appeared. The arginine-homoserine dependent culture was not stabilized and would be of little value in the production of lysine.

| Culture requirement | Gen. | 9 | B-1 | A9+arginine | B-1+arginine |
|---|---|---|---|---|---|
| L-20 Homoserine + arginine. | I | 0(<10) | 2.5×10² | 7.0×10³ | 1.7×10¹⁰ |
|  | II | 0(<10) | 2×10³ | 2.1×10⁵ | 1.7×10¹⁰ |
|  | III | 0(<10) | 6.2×10³ | 3×10⁶ | 1.5×10¹¹ |
|  | IV | 0.5×10¹ | 2×10⁴ | 2.5×10⁷ | 1.5×10¹⁰ |

LYSINE PRODUCTION BY DOUBLE AMINO ACID AUXOTROPHS

Example 1

The following procedure was used to evaluate two cultures for lysine production. The cultures are: (1) the lysine producer (*M. glutamicus*) which has a homoserine requirement; (2) a mutant, L8 (*M. glutamicus* NRRL B–3333) of the present invention that requires both homoserine and threonine.

Inoculum.—The growth from an agar slant of each of the cultures is suspended in 10 ml. of water and 2 ml. used to inoculate a 2-liter Erlenmeyer flask containing 300 ml. of Medium A. This flask is incubated on a rotary shaker at 28° C. for 18 hours, at which time it is used to inoculate a 150-gallon seed fermentor. The vessel contained 100 gallons of Medium B sterilized at 120° C. for 15 minutes. After an incubation of 24 hours at 28° C. under conditions of aeration and agitation, this inoculum stage is transferred to the production stage.

Production.—The production stage was carried out in a 150-gallon fermentor equipped for aeration, agitation, automatic pH control, nutrient feed, and automatic volume control. A medium consisting of 6% sugar as molasses and 1.5% soybean meal as an acid hydrolysate was sterilized (120° C., 20 min.), inoculated with 5% inoculum, and allowed to incubate at 30° C. under conditions of aeration and agitation. During fermentation, the pH was controlled at 6.5 with 28% ammonia water.

When the fermentation had proceeded for 24 hours, fresh nutrient containing 1.5% soybean meal as an acid hydrolysate and sugar at 3–4% as molasses was fed continuously at a rate equivalent to one volume turnover every 24 hours. The fermentation was maintained in this condition for a total of 144 hours. The homoserine requiring culture showed itself to be unstable in that it reverted to a low lysine-producing culture. The L-8 mutant was stable and maintained its ability to produce lysine under conditions of continuous fermanentation. This fact is illustrated in the table comparing the two cultures on their ability to convert sugar to lysine:

| Time, hrs. | Sugar consumed, gm./liter | | Percent conversion to lysine | |
|---|---|---|---|---|
|  | Homoserine only | L8 | Homoserine only | L8 |
| 0–24 | 33 | 23 | 30 | 37 |
| 24–48 | 37.9 | 26 | 31.5 | 34.5 |
| 48–72 | 37 | 25.5 | 24 | 29.5 |
| 72–96 | 37 | 25.3 | 10.4 | 23.7 |
| 96–120 | 27 | 25 | 5.4 | 24 |
| 120–144 | 37 | 25 | 5.4 | 24 |

MEDIUM A

|  | Percent |
|---|---|
| Difco peptone | 1 |
| Difco meat extract | 0.5 |
| Glucose | 2.0 |
| NaCl | 0.25 |
| H₂O to | 100 |

Sterilized at 120° C. for 20 minutes.

MEDIUM B

Sucrose as molasses—6.00
Corn steep liquor—4.95% by weight
Urea—0.20%
NH₄SO₄—1.90
CaCO₃—0.85%
H₂O to—100% pH adjusted to 7.5 with NaOH before sterilization.
Polyglucol 2000 (detodmer)—270 ml.

SOYBEAN MEAL HYDROLYSATE

|  | Grams |
|---|---|
| Soybean meal | 250 |
| H₂SO₄ conc. | 165 |
| H₂O | 885 |

Autoclave at 120° C. for 4 hours. Cool and adjust to pH 7.0 with 28% NH₄OH. Bring to final volume of 2 liters with H₂O.

Equally impressive results are obtained by employing other double auxotrophs of the invention. This is illustrated by the increased lysine yields which were observed with the following double mutants:

In the following examples the culture were streaked on agar slants of a stock culture medium with the following composition:

|  | Percent |
|---|---|
| Meat extract | 0.5 |
| Yeast extract | 0.5 |
| Peptone | 1.0 |
| Agar | 2.0 |

Distilled water.

The cultures were incubated at 28° C. for 16–18 hours and then stored at 3–5° C. for no longer than 2–3 days prior to evaluation.

Preparation of seed culture

The growth on the stock culture slant was washed with 3.0 ml. of the seed medium and a 1.0 ml. aliquot added to each 40 ml. volume of seed medium held in a 250 ml. baffled Erlenmeyer flask (shake-flask).

|  | Percent |
|---|---|
| Peptone | 1.0 |
| Meat extract | 0.5 |
| Glucose | 2.0 |
| Yeast autoylsate | 0.4 | pH 7.0, sterilized 121° C. for 15 minutes.
Distilled water.

The seed culture was incubated on a rotary shaker (220 r.p.m.; 2″ throw) at 28° C. for 18–20 hours.

A 1.5 ml. aliquot of the seed culture was used to inoculate the production medium.

Preparation and inoculation of production medium

*Production medium.*—The semi-synthetic production medium had the following composition:

Potassium dibasic phosphate—940 mg.
Potassium monobasic phosphate—400 mg.
Magnesium sulfate heptahydrate—66 mg.
Ferrous sulfate heptahydrate—1.34 mg.
Manganese sulfate monohydrate—0.54 mg.
Sodium chloride—2.66 mg.
Ammonium sulfate—940 mg.
Biotin—2.0 μg.
Thiamine—13.3 μg.
Soybean hydrolysate—16.0 ml.

Yeast autoylsate—400 mg.
pH adjusted to 7.1 with conc. ammonium hydroxide
30 ml./250 ml. flask
Sterilized at 121° C., 15 min.

The following ingredients are added aseptically to each flask:

Glucose.—5 ml. of a 64% solution previously sterilized by heating at 121° C. for 15 minutes.
Urea.—1 ml. of a 20% solution sterilized by filtration through millipore membrane filter.
Magnesium phosphate.—580 mg. of powder previously sterilized by dry heat (160° C.) for two hours.

In Example 5 a molasses medium was substituted for the semi-synthetic medium.

PREPARATION OF MOLASSES MEDIUM

Invert molasses—11 g.
Soybean hydrolysate—12 ml.
Ammonium sulfate—0.7 g.
Biotin—1.5 μg.
Thiamine—10 μg.
Yeast autoylsate—0.3 g.
Distilled $H_2O$, q.s.—75 ml.
pH to 7.1 with conc. $NH_4OH$.
Dispense 30 ml./250 ml. baffled flask.
Sterilize at 121° C. for 15 min.

Add following aseptically to each flask:

Distilled water—5.0 ml.
Urea (20% solu.)—1.0 ml. sterilized by filtration.
$MgHPO_4$—580 mg. sterilized by dry heat (160° C. for two hours).

EVALUATION OF POTENCY

*M. glutamicus* homoserine-less control culture

EXAMPLE 2.—*MICROCOCCUS GLUTAMICUS* LS 70-113 (NRRL B-3338) HOMOSERINE-LEUCINE-LESS, ISOLEUCINE SPARED MUTANT

| Culture | Lysine HCl, mg./ml. | Percent yield |
|---|---|---|
| 70-113 | 30. | 34.6 |
| 70-113 | 30.2 | 34.7 |
| Homoserine-less control culture | 24.8 | 28.1 |
| Homoserine-less control culture | 25.0 | 32.6 |

EXAMPLE 3.—*M. GLUTAMICUS* 70-113

| Culture | Lysine HCl, mg./ml. | Percent yield |
|---|---|---|
| 70-113 | 33.9 | 34.4 |
| 70-113 | 33.0 | 31.7 |
| Homoserine-less control culture | 28.5 | 28.7 |
| Homoserine-less control culture | 27.9 | 29.0 |

EXAMPLE 4.—*M. GLUTAMICUS* LS 70-114 (NRRL B-3340) HOMOSERINE-LEUCINE-LESS, ISOLEUCINE SPARED MUTANT

| Culture | Lysine HCl, mg./ml. | Percent yield |
|---|---|---|
| 70-114 | 39.2 | 37.1 |
| 70-114 | 39.3 | 34.2 |
| Hoposerine-less control culture | 34.2 | 31. |
| Homoserine-less control culture | 36.9 | 32.9 |
| Homoserine-less control culture | 32.8 | 29.3 |

EXAMPLE 5.—*M. GLUTAMICUS* LS 70-113 +INVERT MOLASSES MEDIUM)

| Culture | Lysine HCl, mg./ml. | Percent yield |
|---|---|---|
| LS 70-113 | 23.7 | 29.9 |
| LS 70-113 | 21.9 | 27.7 |
| Homoserine-less control culture | 18.6 | 21.4 |

EXAMPLE 6.—*M. GLUTAMICUS* 70-113 (NRRL B-3337) HOMOSERINE-LESS AND METHIONINE-LESS; *M. GLUTAMICUS* 70-110 (NRRL B-3339) HOMOSERINE-LESS AND METHIONINE-LESS

| Culture | Lysine HCl, mg./ml. | Percent yield |
|---|---|---|
| 70-110 | 27.4 | 30.9 |
| 70-110 | 28.4 | 31.8 |
| 70-130 | 29.0 | 34. |
| 70-130 | 28.4 | 32.1 |
| Homoserine-less control culture | 24.8 | 28.1 |

EXAMPLE 7.—*M. GLUTAMICUS* 70-130 HOMOSERINE-LESS AND METHIONINE-LESS

| Culture | Lysine HCl, mg./ml. | Percent yield |
|---|---|---|
| 70-130 | 33. | 33.2 |
| 70-130 | 32.4 | 32.7 |
| Homoserine-less control culture | 28.2 | 28.7 |

The dramatic results demonstrated regarding reversion frequencies and lysine production obviously are not limited to the various double mutants shown in the examples, which are merely illustrative. Any organism bearing a double amino acid deficiency in the homoserine pathway, one of the deficiencies being homoserine, would exhibit the same phenomenon.

Any departure from the above description which conforms to the present invention is intended to be included within the scope of the claims.

What is claimed is:

1. A process for the production of lysine which comprises cultivating in an aqueous fermentation medium containing sources of carbon, nitrogen, phosphorous, and at least one member selected from the group consisting of isoleucine, threonine and methionine, under aerobic conditions at a pH of from about 6.0 to 8.0, a nutritionally deficient mutant of *Micrococcus glutamicus* possessing a double amino acid deficiency in the biochemical pathways that are inhibitory and undesirable for lysine production, one of the amino acid deficiencies being homoserine and the other being selected from the group consisting of threonine, methionine, and isoleucine.

2. A process as defined in claim 1 including the step of recovering lysine from the resulting fermentation broth.

3. A process according to claim 1 wherein the *Micrococcus glutamicus* microorganism is selected from the group consisting of *Micrococcus glutamicus* NRRL B-3331, *Micrococcus glutamicus* NRRL B-3332, *Micrococcus glutamicus* NRRL B-3333, *Micrococcus glutamicus* NRRL B-3334, *Micrococcus glutamicus* NRRL B-3335, *Micrococcus glutamicus* NRRL B-3337, *Micrococcus glutamicus* NRRL B-3338, *Micrococcus glutamicus* NRRL B-3339 and *Micrococcus glutamicus* NRRL B-3340.

References Cited

UNITED STATES PATENTS 2,979,439  4/1961  Kinoshita et al. _____ 195—47

LIONEL M. SHAPIRO, Primary Examiner